United States Patent [19]
Roberts et al.

[11] Patent Number: 6,006,071
[45] Date of Patent: Dec. 21, 1999

[54] RF COMMUNICATIONS SYSTEM OPERABLE IN THE PRESENCE OF A REPETITIVE INTERFERENCE SOURCE AND RELATED METHODS

[75] Inventors: Richard D. Roberts, Palm Bay; George R. Nelson, Merritt Island, both of Fla.

[73] Assignee: Intersil Corporation, Palm Bay, Fla.

[21] Appl. No.: 09/006,071

[22] Filed: Jan. 12, 1998

[51] Int. Cl.⁶ ..................................... H04B 1/00
[52] U.S. Cl. .......................... 455/63; 455/67.1; 455/67.5; 455/403
[58] Field of Search ............................. 455/63, 66, 67.1, 455/67.3, 67.5, 88, 295–296, 298–299, 402–403; 375/346; 219/715–716; 381/311, 71.3

[56] References Cited

U.S. PATENT DOCUMENTS

| | | | |
|---|---|---|---|
| 4,479,033 | 10/1984 | Brown et al. | 455/402 |
| 4,996,484 | 2/1991 | Spies | 455/298 X |
| 5,129,003 | 7/1992 | Saruta | 381/71.3 |
| 5,241,687 | 8/1993 | Short | 455/45 |
| 5,349,700 | 9/1994 | Parker | 455/193.1 |
| 5,412,658 | 5/1995 | Arnold et al. | 455/67.1 X |
| 5,428,669 | 6/1995 | McCarthy | 455/462 |
| 5,483,689 | 1/1996 | O'Donnell, Jr. et al. | 455/200.1 |
| 5,483,693 | 1/1996 | Bose et al. | 455/273 |
| 5,491,839 | 2/1996 | Schotz | 455/66 |
| 5,574,979 | 11/1996 | West | 455/63 |
| 5,623,531 | 4/1997 | Nilssen | 455/402 |
| 5,657,325 | 8/1997 | Lou et al. | 370/334 |
| 5,812,940 | 9/1998 | Lindell | 455/114 |
| 5,828,293 | 10/1998 | Rickard | 455/63 X |

OTHER PUBLICATIONS

Jonathan Horne, et al., "Modeling and Mitigation of Interference in the 2.4 GHz ISM Band," Pub. 2.4 GHz Interference, Mar./Apr. 1997, pp. 59–71.

*Primary Examiner*—William G. Trost
*Attorney, Agent, or Firm*—Allen, Dyer, Doppelt, Milbrath & Gilchrist, P.A.

[57] ABSTRACT

An RF communication system is for operating in the presence of a repetitive RF interference source powered from an Alternating Current (AC) power line. The system uses redundant transmission synchronized to the power line to ensure accurate reception by at least one second device. The RF communication system includes a first device powered from an AC power line which also powers the repetitive RF interference source. The first device, in turn, preferably includes an RF transmitter for transmitting in a frequency band of the repetitive RF interference source, a power line sensor, and a data transmit controller. The data transmit controller generates a plurality of data packets with each data packet including an error detecting portion. The data transmit controller also operates the RF transmitter to produce repetitive first and second transmissions of a same data packet responsive to the power line sensor. Accordingly, at least one of the first and second transmissions occurs during an OFF period of the repetitive RF interference source. The second device also preferably includes a data receive controller for receiving the repetitive first and second transmissions of same data packets and selecting one based upon the error detecting portions thereof to thereby avoid interference from the repetitive RF interference source.

40 Claims, 3 Drawing Sheets

RF COMMUNICATIONS SYSTEM OPERABLE IN THE PRESENCE OF A REPETITIVE INTERFERENCE SOURCE AND RELATED METHODS

FIELD OF THE INVENTION

The present invention relates to the field of communications, and, more particularly, to a radio frequency (RF) communication system to overcome certain types of repetitive interfering sources.

BACKGROUND OF THE INVENTION

Radio frequency communications systems commonly operate in the presence of interfering sources. Unfortunately, interference may degrade or totally impede communications. One particularly troublesome interference source is a microwave oven.

The microwave oven emits interference in a pulsating manner with a repetition rate equal to that of the power line, and at a 50% duty cycle. In the United States, for example, the nominal repetition period is 1/60 of a second or once every 16.7 msec. Microwave ovens typically do not include any filtering of the half-wave rectified operating voltage applied to the microwave magnetron. In other words, the microwave oven emits a noisy, unstable radio frequency pulse that is controlled by the half-wave rectification of the primary power line frequency. The resulting radio frequency interference is at a nominal frequency of 2.45 GHz, and presents a difficulty with communications systems sharing this band. This frequency range has also been allocated for certain communications systems, such as wireless local area networks (WLANs).

A WLAN is a flexible data communication system that may be an extension to, or an alternative for, a wired LAN within a building or campus. A WLAN uses radio technology to transmit and receive data over the air, thereby reducing or minimizing the need for wired connections. Accordingly, a WLAN combines data connectivity with user mobility, and, through simplified configurations, also permits a movable LAN.

Of course, there are other communications systems, typically used in the home, and that may also be affected by the interference from a microwave oven. For example, a cordless telephone, home automation communication systems, or a wireless audio speaker system may be affected by microwave oven generated interference.

The interference problem presented by a microwave oven is addressed, for example, in U.S. Pat. No. 5,574,979 to West and entitled "Periodic Interference Avoidance in a Wireless Radio frequency Communication System". The patent discloses a hierarchical communication scheme including wireless roaming computing and data collection devices. The system monitors the received signal strength and error rates to determine if the interference is periodic in nature so that the system can predict the future interference and transmit only during off periods of the interference.

When a communication time interval is forced to cut off due to an impending presence of interference, the adjusting protocol can determine when it is most efficient to stop the communication, and can continue the rest of the communication time interval structure after the interference abates. Unfortunately, the system for monitoring received signal strength and error rates is relatively complicated and synchronization may be difficult. In addition, both a forward and return channel are needed, thereby complicating the system for certain applications.

Also related to operating a communication system in the presence of interference, U.S. Pat. No. 5,428,669 to McCarthy discloses a cordless telephone set including a base and a handset. One of the units select alternate frequencies in response to a series of unacknowledged communications, until it receives an acknowledgment on a particular channel. If no acknowledgment is received the system reverts back to the originally selected RF channel.

Unfortunately, a microwave oven presents a source of electrical interference that is not readily filtered, and which is capable of causing disruption of communications in a frequency band of the interference. Prior attempts to address the periodic interference caused by a microwave oven have required relatively complicated circuitry, have required two-way communication, and may not have been robust in the presence of the high interfering signals.

SUMMARY OF THE INVENTION

In view of the foregoing background, it is therefore an object of the present invention to provide an RF communications system which is relatively uncomplicated, which is robust, and which can effectively operate in the presence of repetitive interfering sources, such as a microwave oven.

This and other objects, advantages and features of the present invention are provided by an RF communication system for operating in the presence of a repetitive RF interference source powered from an Alternating Current (AC) power line, and which uses redundant transmission synchronized to the power line to ensure accurate reception by at least one second receiver device.

More particularly, the repetitive RF interference source has repetitive ON and OFF periods based upon the AC power line, and the RF communication system comprises a first device powered from an AC power line which also powers the repetitive RF interference source. The first device, in turn, preferably comprises an RF transmitter for transmitting in a frequency band of the repetitive RF interference source, a power line sensor, and data transmit control means. The data transmit control means generates a plurality of data packets with each data packet including an error detecting portion. The data transmit control means also operates the RF transmitter to produce repetitive first and second transmissions of a same data packet synchronized to the power line sensor. Accordingly, at least one of the first and second transmissions occurs during an OFF period of the repetitive RF interference source.

The system also includes at least one second device including an RF receiver for receiving in the frequency band of the repetitive RF interference source. The second device also preferably includes data receive control means for receiving the repetitive first and second transmissions of same data packets and selects one based upon the error detecting portions thereof to thereby avoid interference from the repetitive RF interference source. In other words, the transmissions are repeated, and the receiver selects one or the other based upon the error detection coding.

The RF transmitter and RF receiver preferably operate in a frequency range of about 2.45 GHz. This frequency range is unfortunately in the band of most conventional microwave ovens which typically define the repetitive RF interference source.

The data transmit control means preferably comprises means for generating each data packet and error detecting portion to be less than or equal to one-half a period of the AC power line. Accordingly, no complicated data handling is needed for carryover to a next interval. In addition, the communication system is especially applicable to a communication system including only one way communication from the first transmitter device to at least one second receiver device, such as for remote wireless audio speakers.

The data control means may include Cyclic Redundancy Check (CRC) coder means for generating a CRC checksum error detecting portion for each data packet. The data transmission control means may include a comparator for generating a square wave responsive to sensing the AC power line and an edge detector coupled thereto for triggering transmission based upon the AC power line. In addition, the RF transmitter and receiver may operate using spread spectrum techniques.

Another aspect of the invention relates to compatibility where the power line includes multiple phases. In this variation, the first device preferably further comprises phase selecting means for selecting operation for one of the plurality of power phases. Indicator means may be provided at the second device to indicate correct receipt of a data packet to thereby enable a user to select operation of the first device for one of the AC power line phases by stepping through operation for each phase. In particular, the phase selecting means may comprise delay adding means for adding a predetermined delay before transmitting each data packet based upon the respective selected power phase.

A method aspect of the invention is for operating a radio frequency (RF) communication system in the presence of a repetitive RF interference source powered from the AC power line. The method preferably comprises the steps of: sensing the AC power line; generating a plurality of data packets with each data packet including an error detecting portion, and for operating the RF transmitter to produce repetitive first and second transmissions of a same data packet responsive to the AC power line so that at least one of the first and second transmissions occurs during an OFF period of the repetitive RF interference source; and receiving at the RF receiver the repetitive first and second transmissions of same data packets and selecting one based upon the error detecting portions thereof to thereby avoid interference from the repetitive RF interference source.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
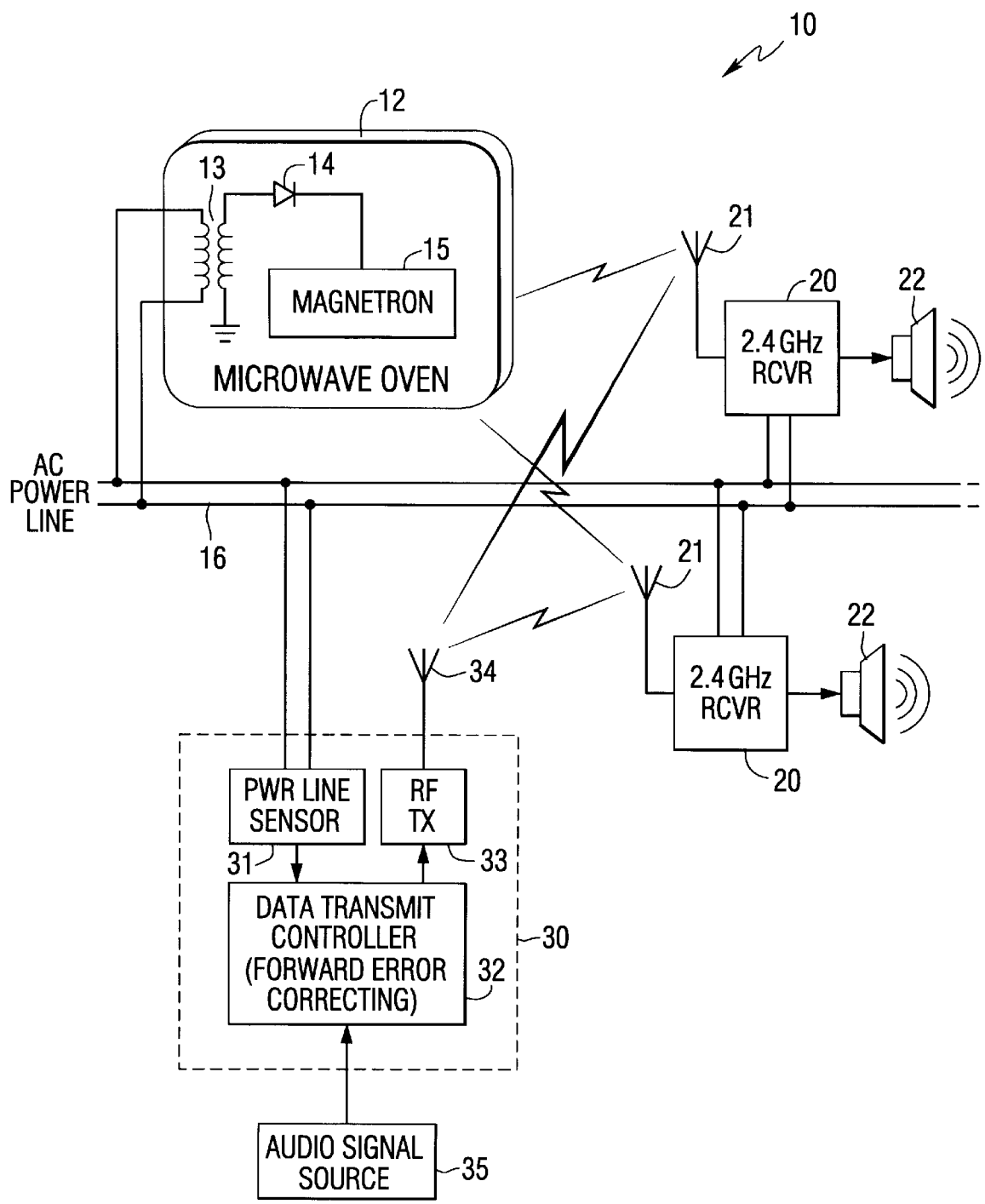
FIG. 1 is a schematic block diagram of an RF communications system for wireless speakers in accordance with an embodiment of the present invention.

Referring initially to FIG. 1, an RF communication system 10 for wireless speakers is described. The system 10 is capable of operating in the presence of a repetitive RF interference source powered from an Alternating Current (AC) power line 16. The interference source is the illustrated microwave oven 12. The microwave oven 12 includes a power transformer 13, a diode 14 and a magnetron tube 15 powered from the AC power line 16. As will be readily understood by those skilled in the art, the microwave oven 12 emits interference on a nominal frequency of 2.45 GHz., and in a pulsating manner with a repetition rate equal to that of the local AC power line period and at a 50% duty cycle. In the United States this corresponds to a nominal repetition rate of 1/60. The resulting RF interference to communication systems sharing the frequency band is overcome by the system 10 in accordance with the present invention.

The communication system 10 of the illustrated embodiment includes a pair of receiver devices 20, and their respective antennas 21. The receiver devices 20 are connected to respective audio loudspeakers 22 as will be readily appreciated by those skilled in the art. In the illustrated embodiment, the receiver devices 20 are also powered from the AC power line 16, although the interference is RF coupled to the receivers through the antennas 21.

The communication system 10 also includes a transmitter device 30 which, in turn, includes the illustrated power line sensor 31, data transmit controller 32, RF transmitter 33, and antenna 34. The transmitter device 30 is connected to the audio signal source 35, which may be a digital audio signal source, such as a compact disk player, for example. As will be readily appreciated by those skilled in the art, the signal source may also be an analog audio signal source that is processed into an appropriate digital format. In addition to the illustrated speaker communication system 10, the system may be used to transmit data files, digitized video, telephony signals, Internet data, etc., as will be readily understood by those skilled in the art.

Figure 2:
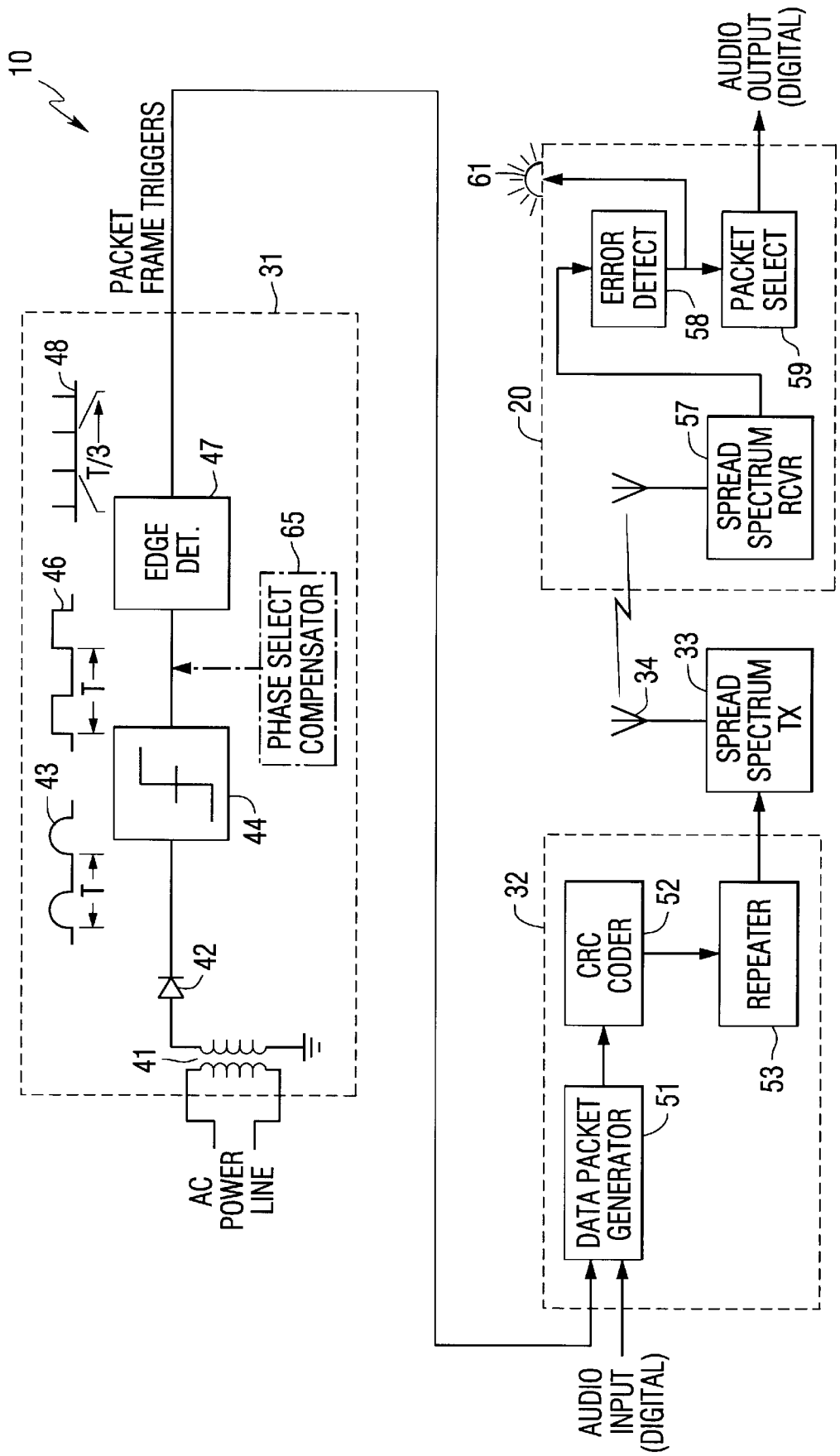
FIG. 2 is a schematic block diagram illustrating, in greater detail, the communication system of FIG. 1.

Referring now additionally to the more detailed diagram of FIG. 2, further aspects of the invention are explained. The communication system 10 uses redundant transmission synchronized to the power line to ensure accurate reception by the receiver devices 20. More particularly, the microwave oven 12 has repetitive ON and OFF periods based upon tile AC power line, and the RF communication system 10 comprises the transmitter device 30 powered from the AC power line 16 which also powers the microwave oven.

The transmitter device 30 includes a power line sensor 31 for generating a series of packet frame trigger signals synchronized to the AC power line 16.

The sensor 31 illustratively includes an input transformer 41 and a diode connected in series with the secondary winding to generate the first half-wave rectified sinusoidal waveform 43. This signal is passed to the illustrated comparator 44 to produce the square wave signal waveform 46. The comparator 44, in turn, is connected to the edge detector 47 which generates the series of data packet frame triggers as shown in the waveform 48. Considered in somewhat different terms, the power line sensor 31 functions as a zero crossing voltage detector which generates a plurality of trigger signals synchronized to the zero crossings of voltage of the AC power line 16.

The data transmit controller or control means 32 accepts as inputs the digital audio signals, and the packet frame triggers from the power line sensor 31. The data transmit controller 32 includes a data packet generator 51 for digitizing the input data and assembling the digitized data into data packets. A cyclic redundancy check (CRC) coding is performed by the illustrated CRC block 52 as would be readily understood by those skilled in the art. The data transmit control means 32 also operates the RF transmitter 33 to produce repetitive first and second transmissions of a same data packet using the schematically illustrated repeater circuit 53 based upon the packet frame trigger signals from the power line sensor 31. Accordingly, at least one of the first and second transmissions occurs during an OFF period of the repetitive RF interference from the operating microwave oven 12.

Of course, the data packet generator 51 and CRC coder 52 of the data transmit control means 32 preferably generate each data packet and error detecting portion to be less than or equal to one-half a period of the AC power line. Accordingly, no complicated data handling is needed for carryover to a next interval. In addition, the communication system 10 is especially applicable to a communication system including only one way communication from the first device to at least one second device, such as for the illustrated remote audio speakers 22.

The system 10 as shown in FIG. 2 also includes a receiver device 20 illustrated in greater detail. The receiver device 20 includes a spread spectrum RF receiver 57 which cooperates with the spread spectrum RF transmitter 33. As would be readily understood by those skilled in the art, spread spectrum communications may also lessen the susceptibility of the communication link to other potential interference sources. The assignee of the present invention, Harris Corporation, has developed and offers chip sets for a WLAN under the marks PRISM I and PRISM II, which can be readily modified to provide the spread spectrum transmitter and receiver functions as would be appreciated by those skilled in the art.

The receiver device 20 also includes an error detecting circuit 58 and a packet select circuit 59 connected thereto. Accordingly, the receiver device 20 receives the redundantly transmitted first and second transmissions, and if the first packet is correct, it is kept, and if the packet is in error it is discarded and the second packet is used. In other words, the invention provides a relatively straightforward ½ forward error correcting retransmission approach for assuring correct operation in the present of the interference created by the microwave oven 12. No return channel is needed as in other more complicated approaches as have been attempted in the prior art, such as U.S. Pat. No. 5,574,979 to West.

Another aspect of the invention relates to compatibility where the AC power line 16 includes multiple phases. In the illustrated embodiment, the power line sensor 31 portion of transmitter device 30 further comprises phase selecting and compensating means 65 for selecting operation for one of the plurality of power phases. An indicator in the form of an LED 61, for example, may be provided at the receiver device 20 to indicate correct receipt of a data packet to thereby enable a user to select operation of the transmitter device 30 for one of the AC power line phases.

Figure 3:
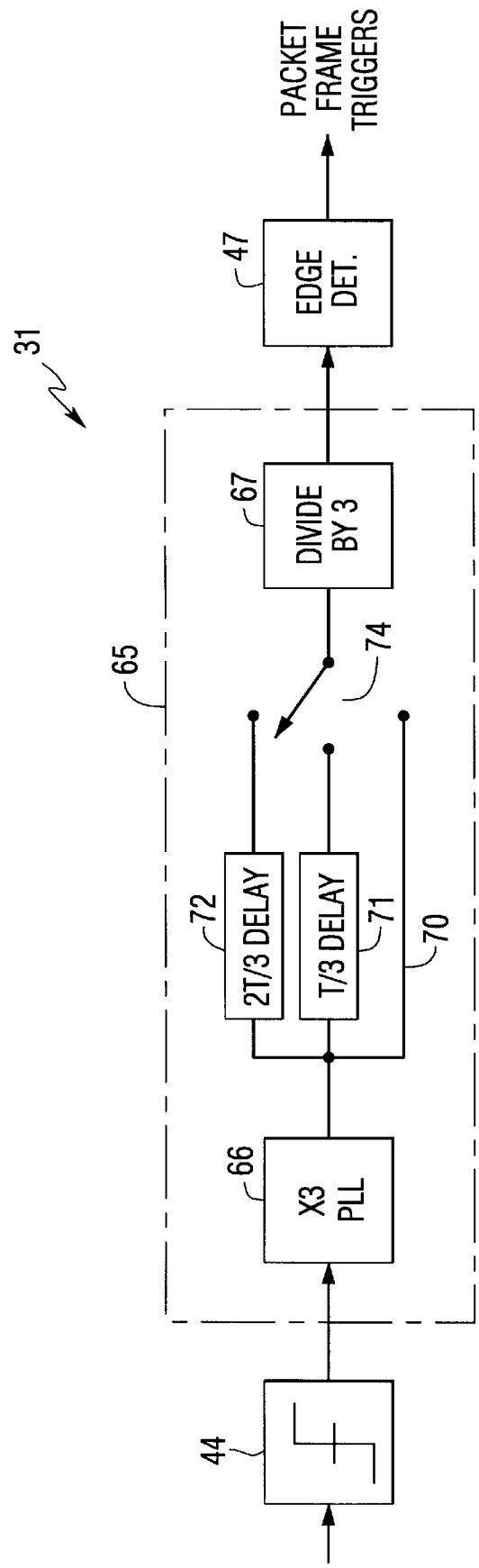
FIG. 3 is a schematic block diagram showing the phase select and compensation circuit of the present invention.

As more fully understood by additional reference to the schematic block diagram of FIG. 3, a three-times multiplying phase locked loop (PLL) 66 is locked to the line frequency to produce a 180 Hz square wave for a 60 Hz power line. Each phase of a conventional three phase power line is offset from adjacent phases by a time interval equal to T/3, where T is the period of the power line, such as 16.7 msec for a 60 Hz power line. Accordingly, the circuit includes three selectable configurations. A first configuration is set by a direct connection 70 between the x3 PLL 66 and the divide by three circuit 67, as would be used if the transmitter device 30 and the microwave oven 12 were powered by the same phase. A second configuration is provided by the T/3 delay 71, and a third configuration is selected by the 2T/3 delay 72 as will be readily appreciated by those skilled in the art by stepping through operation for each phase. The illustrated manual switch 74 may be used to set the device 30 to the desired phase operating configuration.

Since the power connections, and hence coupled phases are generally static, a user can set the desired configuration and the system 10 will operate properly, unless one of the transmitter device 30 or microwave oven 12 are reconnected to different power line phases. The user sets the desired configuration by turning on the microwave oven 12, stepping through the configurations using the switch 74, and observing the indicator 61 to determine which configuration produces successful communication.

A method aspect of the invention is for operating an RF communication system 10 in the presence of a repetitive RF interference source, such as a microwave oven 12, both powered from an AC power line, although the phases may be different. The method preferably comprises the steps of: sensing the AC power line 16; generating a plurality of data packets with each data packet including an error detecting portion, and for operating the RF transmitter 33 to produce repetitive first and second transmissions of a same data packet responsive to the AC power line so that at least one of the first and second transmissions occurs during an OFF period of the repetitive RF interference source; and receiving at the RF receiver device 20 the repetitive first and second transmissions of same data packets and selecting one based upon the error detecting portions thereof to thereby avoid interference from the repetitive RF interference source.

The present invention has been described for use in a wireless speaker communication system. Those of skill in the art will appreciate many other similar applications. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A radio frequency (RF) communication system or operating in the presence of a repetitive RF interference source powered from an Alternating Current (AC) power line, the repetitive RF interference source having repetitive ON and OFF periods based upon the AC power line, the RF communication system comprising:

a first device powered from an AC power line which also powers the repetitive RF interference source, said first device comprising an RF transmitter for transmitting in a frequency band of the repetitive RF interference source, a power line sensor, and data transmit control means for generating a plurality of data packets with each data packet including an error detecting portion, and for operating said RF transmitter to produce repetitive first and second transmissions of a same data packet responsive to said power line sensor so that at least one of the first and second transmissions occurs during an OFF period of the repetitive RF interference source; and at least one second device comprising an RF receiver for receiving in the frequency band of the repetitive RF interference source, and data receive control means for receiving the repetitive first and second transmissions of same data packets and selecting one based upon the error detecting portions thereof to thereby avoid interference from the repetitive RF interference source.

2. An RF communication system according to claim 1 wherein said data transmit control means comprises means for generating each data packet and error detecting portion to be less than or equal to one-half a period of the AC power line.

3. An RF communication system according to claim 1 wherein said first device and said at least one second device establish only a one-way communication channel therebetween.

4. An RF communication system according to claim 1 wherein said first device further comprises audio input means for accepting at least one audio signal for transmission; and wherein said at least one second device further comprises at least one speaker for reproducing the at least one audio signal.

5. An RF communication system wherein the RF claim 1 wherein the RF transmitter and RF receiver operate in a frequency range of about 2.45 GHz.

6. An RF communication system according to claim 1 wherein said data control means includes Cyclic Redundancy Check (CRC) means for generating a CRC checksum error detecting portion for each data packet.

7. An RF communication system according to claim 1 wherein said RF transmitter is a spread spectrum transmitter; and wherein said RF receiver is a spectrum receiver.

8. An RF communication system according to claim 1 wherein the AC power line comprises a plurality of power phases; and wherein said first device further comprises phase selecting means for selecting operation for one of the plurality of power phases.

9. An RF communication system according to claim 8 wherein said at least one second device further comprises indicator means for indicating correct receipt of a data packet to enable a user to select operation of said first device for one of the AC power line phases.

10. An RF communication system according to claim 8 wherein said phase selecting means comprise delay adding means for adding a predetermined delay before transmitting each data packet based upon the respective selected power phase.

11. An RF communication system according to claim 1 wherein said power line sensor comprises a comparator for generating a square wave responsive to sensing the AC power line and an edge detector coupled thereto for triggering transmission based upon the AC power line.

12. A radio frequency (RF) communication system for operating in the presence of a repetitive RF interference source powered from an Alternating Current (AC) power line, the repetitive RF interference source having repetitive ON and OFF periods based upon the AC power line, the RF communication system comprising:

a first device powered from an AC power line which also powers the repetitive RF interference source, said first device comprising
audio input means for accepting at least one audio signal for transmission,
an RF transmitter for transmitting in a frequency band of the repetitive RF interference source,
a power line sensor, and
data transmit control means for generating a plurality of data packets from said at least one audio input means with each data packet including an error detecting portion, and for operating said RF transmitter to produce repetitive first and second transmissions of a same data packet responsive to said power line sensor so that at least one of the first and second transmissions occurs during an OFF period of the repetitive RF interference source; and at least one second device comprising
an RF receiver for receiving in the frequency band of the repetitive RF interference source,
data receive control means for receiving the repetitive first and second transmissions of same data packets and selecting one based upon the error detecting portions thereof to thereby avoid interference from the repetitive RF interference source, and
at least one audio speaker operatively connected to said data receiver control means for reproducing the at least one audio signal.

13. An RF communication system according to claim 12 wherein said data transmit control means comprises means for generating each data packet and error detecting portion to be less than or equal to one-half a period of the AC power line.

14. An RF communication system according to claim 12 wherein said first device and said at least one second device establish only a one-way communication channel therebetween.

15. An RF communication system according to claim 12 wherein the RF transmitter and RF receiver operate in a frequency range of about 2.45 GHz.

16. An RF communication system according to claim 12 wherein said data control means includes Cyclic Redundancy Check (CRC) means for generating a CRC checksum error detecting portion for each data packet.

17. An RF communication system according to claim 12 wherein said RF transmitter is a spread spectrum transmitter; and wherein said RF receiver is a spread spectrum receiver.

18. An RF communication system according to claim 12 wherein the AC power line comprises a plurality of power phases; and wherein said first device further comprises phase selecting means for selecting operation for one of the plurality of power phases.

19. An RF communication system according to claim 18 wherein said at least one second device further comprises indicator means for indicating correct receipt of a data packet to enable a user to select operation of said first device for one of the AC power line phases.

20. An RF communication system according to claim 18 wherein said phase selecting means comprise delay adding means for adding a predetermined delay before transmitting each data packet based upon the respective selected power phase.

21. An RF communication system according to claim 12 wherein said power line sensor comprises a comparator for generating a square wave responsive to sensing the AC power line and an edge detector coupled thereto for triggering transmission based upon the AC power line.

22. A radio frequency (RF) communication system for operating in the presence of a repetitive RF interference source powered from an Alternating Current (AC) power line having a plurality of phases, the repetitive RF interference source having repetitive ON and OFF periods based upon the AC power line, the RF communication system comprising:

a first device powered from an AC power line which also powers the repetitive RF interference source, said first device comprising
an RF transmitter for transmitting in a frequency band of the repetitive RF interference source, a power line sensor, data transmit control means for generating a plurality of data packets with each data packet including an error detecting portion, and for operating said RF transmitter to produce repetitive first and second transmissions of a same data packet responsive to said power line sensor so that at least one of the first and second transmissions occur during an OFF period of the repetitive RF interference source, and phase selecting means for selecting operation of the data transmit control means for one of the plurality of power phases; and at least one second device comprising an RF receiver for receiving in the frequency band of the repetitive RF interference source, and data receive control means for receiving the at least one transmission to thereby avoid interference from the repetitive RF interference source.

23. An RF communication system according to claim 22 wherein said at least one second device further comprises indicator means for indicating correct receipt of a data packet to enable a user to select operation of said first device for one of the AC power line phases.

24. An RF communication system according to claim 22 wherein said phase selecting means comprise delay adding means for adding a predetermined delay before transmitting each data packet based upon the respective selected power phase.

25. An RF communication system according to claim 22 wherein said data receive control means comprises means for receiving the repetitive first and second transmissions of same data packets and selecting one based upon the error detecting portions thereof to thereby avoid interference from the repetitive RF interference source.

26. An RF communication system according to claim 22 wherein said data transmit control means comprises means for generating each data packet and error detecting portion to be less than or equal to one-half a period of the AC power line.

27. An RF communication system according to claim 22 wherein said first device and said at least one second device establish only a one-way communication channel therebetween.

28. An RF communication system according to claim 22 wherein said first device further comprises audio input means for accepting at least one audio signal for transmission; and wherein said at least one second device further comprises at least one speaker for reproducing the at least one audio signal.

29. An RF communication system according to claim 22 wherein the RF transmitter and RF receiver operate in a frequency range of about 2.45 GHz.

30. An RF communication system according to claim 22 wherein said RF transmitter is a spread spectrum transmitter; and wherein said RF receiver is a spectrum receiver.

31. A method for operating a radio frequency (RF) communication system in the presence of a repetitive RF interference source powered from an Alternating Current (AC) power line, the repetitive RF interference source having repetitive ON and OFF periods based upon the AC power line, the RF communication system comprising a first device powered from an AC power line which also powers the repetitive RF interference source and at least one second device, the first device comprising an RF transmitter for transmitting in a frequency band of the repetitive RF interference, the at least one second device comprising an RF receiver for receiving in the frequency band of the repetitive RF interference source, the method comprising the steps of:

sensing the AC power line;

generating a plurality of data packets with each data packet including an error detecting portion, and for operating the RF transmitter to produce repetitive first and second transmissions of a same data packet responsive to the AC power line so that at least one of the first and second transmissions occurs during an OFF period of the repetitive RF interference source; and receiving at the RF receiver the repetitive first and second transmissions of same data packets and selecting one based upon the error detecting portions thereof to thereby avoid interference from the repetitive RF interference source.

32. A method according to claim 31 wherein the step of generating the plurality of data packets comprises generating each data packet and error detecting portion to be less than or equal to one-half a period of the AC power line.

33. A method according to claim 31 further comprising the step of establishing only a one-way communication channel from the first device to the at least one second device.

34. A method according to claim 31 further comprising the step of accepting at least one audio signal for transmission.

35. A method according to claim 31 further comprising step of operating the RF transmitter and RF receiver in a frequency range of about 2.45 GHz.

36. A method according to claim 31 wherein the step of including an error detection portion comprises generating a CRC checksum error detecting portion for each data packet.

37. A method according to claim 31 further comprising the step of operating the RF transmitter for spread spectrum.

38. A method according to claim 31 wherein the AC power line comprises a plurality of power phases; and further comprising the step of selecting operation of the first device for one of the plurality of power phases.

39. A method according to claim 38 further comprising the step of indicating at the at least one second device correct receipt of a data packet to enable a user to select operation of the first device for one of the AC power line phases.

40. A method according to claim 38 wherein the step of selecting comprises adding a predetermined delay before transmitting each data packet based upon the repetitive selected power line phase.

* * * * *

UNITED STATES PATENT AND TRADEMARK OFFICE
CERTIFICATE OF CORRECTION

PATENT NO. : 6,006,071
DATED : December 21, 1999
INVENTOR(S) : Richard D. Roberts, George R. Nelson It is certified that error appears in the above-identified patent and that said Letters Patent is hereby corrected as shown below:

Column 1, line 51    Strike: "frequency"
                     Insert: --Frequency--

Column 2, line 56    Strike: "are"
                     Insert: --is--

Column 4, line 41    Strike: "tile"
                     Insert: --the--

Column 7, line 21    Strike: "wherein the RF"
                     Insert: --according to--

Signed and Sealed this

Twenty-sixth Day of September, 2000

Attest:

Q. TODD DICKINSON

*Attesting Officer*    *Director of Patents and Trademarks*